United States Patent [19]
Plantholt

[11] Patent Number: 5,517,252
[45] Date of Patent: May 14, 1996

[54] DEVICE FOR REPRODUCING PICTURE SIGNALS IN LETTER-BOX FORMAT

[75] Inventor: Martin Plantholt, Limburg, Germany

[73] Assignee: Deutsche Thomson-Brandt GmbH, Villingen-Schwenningen, Germany

[21] Appl. No.: 132,933

[22] Filed: Oct. 7, 1993

Related U.S. Application Data

[63] Continuation of PCT/EP92/00759, Apr. 4, 1992.

[30] Foreign Application Priority Data

Apr. 12, 1991 [DE] Germany .......................... 41 11 979.7

[51] Int. Cl.⁶ ..................................................... H04N 7/08
[52] U.S. Cl. ........................ 348/486; 348/913; 348/432; 358/310
[58] Field of Search ................................... 348/486, 910, 348/433, 432, 434, 475; 358/310; H04N 7/08

[56] References Cited

U.S. PATENT DOCUMENTS

| | | | |
|---|---|---|---|
| 4,119,999 | 10/1978 | Gallo | 348/486 |
| 5,208,620 | 5/1993 | Sugimori et al. | 348/913 |
| 5,229,847 | 7/1993 | Gibson | 348/486 |

FOREIGN PATENT DOCUMENTS

| | | | |
|---|---|---|---|
| 0372555 | 6/1990 | European Pat. Off. | H04N 9/81 |
| WO91/16793 | 10/1991 | WIPO | H04N 9/83 |

OTHER PUBLICATIONS

Adaptive Luminanz–Chrominanz–Trennung mit unterschiedlich farbtraregverkoppelten Samplingphasen by R. Schweer & M. Plantholt Fernsehund Kino–Technik 44 Jahrgang Nr. Dec. 1990 pp. 673 to 681.

Primary Examiner—Victor R. Kostak
Attorney, Agent, or Firm—J. S. Tripoli; F. A. Wein

[57] ABSTRACT

An apparatus for recording/reproducing television signals transmitted in the letter-box format whereby 16:9 aspect ratio picture information is sandwiched between black areas corresponding to the top and bottom portions of the display, and wherein auxiliary items of information can be modulated onto the color sub-carrier of the television signal. The apparatus includes a luminance channel, an adaptive filter and a digital chrominance decoder for separating the television signal into a chrominance component and a luminance component. First apparatus digitally demodulates the auxiliary information from the color sub-carrier. Second apparatus applies the auxiliary signals to the luminance channel during the scanning of the black areas.

2 Claims, 5 Drawing Sheets

DEVICE FOR REPRODUCING PICTURE SIGNALS IN LETTER-BOX FORMAT

This is a continuation of PCT application PCT/EP 92/00759 filed Apr. 4, 1992 by Martin Plantholt and tilted "APPARATUS FOR RECORDING AND/OR REPRODUCING PICTURE SIGNALS".

STATE OF THE ART

The so-called letter box process is under discussion for use with the compatible introduction of a 16:9 screen format into existing television standards (e.g. PAL, SECAM, NTSC) which use the 4:3 format. With this process, the 16:9 picture information is represented by black bands at the upper and lower edges of the picture tubes of 4:3 receivers. The matching of the geometrical ratios to the 4:3 receivers requires vertical transcoding of the 16:9 source signal to represent only 431 lines in the visible picture window of the 4:3 receiver. The remaining 144 active lines (575 lines–431 lines=144 lines) appear as the black bands, each of 72 lines, at the upper and lower edges of the picture in the 4:3 receiver. The description of a corresponding process is to be found in "Verbesserungsmöglichkeiten und Entwicklungstendenzen bei PAL", G. Holoch, FKTG lecture, 17.01.1989 Berlin.

Auxiliary items of information can be transmitted in the 144 lines which appear as black bands in the 4:3 receiver for providing a format filling presentation without reduced resolution in a 16:9 receiver. This auxiliary information may be transmitted in the so-called ultra-black region in accordance with "Die neuen Wege des alten PAL", A. Ziemerr, E. Matzel, Funkschau 18,1989. Thereby, the region between the black level and e.g., half the synchronization pulse height is utilized. Consequently, the incorporated auxiliary signal is not visible on the 4:3 receiver. A method of transmission which conveys such auxiliary items of information in the form of vestigial side band modulation of the colour sub-carrier is specified in PCT/EP91/00397.

It is an object of the invention to provide an apparatus which can both record and reproduce picture signals together with auxiliary items of information using known integrated circuits. Basically, the invention is an integrated circuit which receives a FBAS signal and separates the luminance components and the chrominance components into separate signals. The separation is effect using an adaptive filter and a digital chrominance decoder for the colour sub-carrier. The integrated circuit is used to digitally demodulate auxiliary items of information which are modulated onto the colour sub-carrier of FBAS signals in the letter box format using a chrominance decoder. The demodulated auxiliary items of information are supplied to the luminance input of the apparatus during the lines in the black bands of the letter box format.

An integrated comb filter circuit for separating chrominance and luminance signals is described in the publication "Adaptive Luminanz-Chrominanz-Trennung mit unterschiedlich farbträgerverkoppelten Sampling-Phasen", R. Schweer, M. Plantholt, Fernseh- & Kinotechnik 12/1990. However, a digital comb filter decoder including this integrated circuit can, with appropriate modifications, likewise be used to demodulate auxiliary items of information of FBAS letter box signals as a preliminary to an S-VHS or Hi8 recording. Recording and/or reproduction of all the constituents of such letter box signals with the aid of an S-VHS or Hi8 recorder is thereby possible.

Auxiliary items of information, which were modulated onto a carrier in accordance with PCT/EP91/00397 for compatible transmission in a standard channel, generally occupy the full width of a channel (e.g., 5 MHz for PAL). This then likewise applies for recording. Present day video recorders, which operate in accordance with the S-VHS or Hi8 technique for example, can of course in principle record such a bandwidth but they do expect to receive the luminance signal and the chrominance signal over separate signal leads. Thus, in principle, the auxiliary items of information can be recorded in the wide band luminance channel of a recorder of this type. Nevertheless, time base fluctuations, which are associated with the recording, exert a disadvantageous effect during the processing and evaluation of the auxiliary items of information in a corresponding receiver. This problem can be overcome if the auxiliary items of information are demodulated before the recording and are recorded as base band signals.

The above-mentioned integrated comb filter circuit can be used to demodulate the auxiliary items of information and to simultaneously split the FBAS signal into a luminance Y and a chrominance component C if the sampling of the luminance signals is carried out with a phase angle corresponding to the modulation of the auxiliary items of information. Advantageously thereby, the phase angle of the sampling clock rate is made available by a phase locked loop circuit (PLL) located in the integrated circuit. Advantageously, filter means already available in the circuit can be utilized. The Nyquist filter in accordance with PCT/EP91/00397 which is needed to demodulate the auxiliary items of information and which has its Nyquist point at the colour sub-carrier frequency may additionally be integrated into such a circuit if necessary.

DRAWINGS

The invention is described with reference to the drawings in which.

Figure 1:
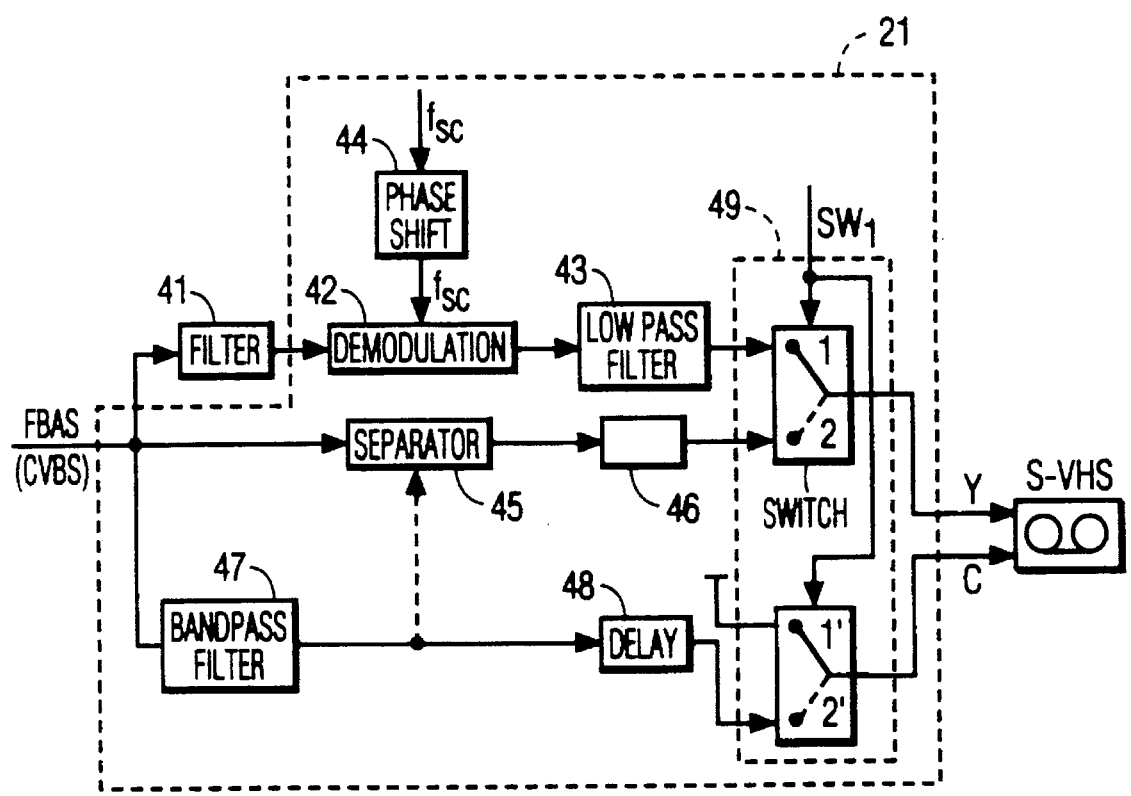
FIG. 1 is a preferred embodiment of the S-VHS recorder having a preliminary colour sub-carrier demodulator and change-over switches.

FIG. 1 shows a circuit for demodulating colour sub-carrier modulated auxiliary items of information, for separating a FBAS signal into a luminance signal Y and chrominance signal C, and for applying the separated signals to an S-VHS or Hi8 recorder. The frequency range located around the colour sub-carrier is filtered out from the incoming FBAS signal by means of a band pass filter 47 and the chrominance signal C is thus obtained. If necessary, the chrominance signal is supplied to a delay circuit 48 which undertakes a matching in time to the luminance signal processing or to the processing time for the auxiliary items of information. This chrominance signal reaches a fourth input terminal 2' of a video switching device 49 that can alter a switch position in dependence on the lines being scanned. A chrominance signal representing a chrominance picture content is not present during the letter box lines (switch position 1 or 1'). Advantageously in this case, the third input terminal 1' of the video switching device 49 can be connected to a constant value, e.g., earth or the average grey level (non-coloured). The luminance signal Y can be obtained from the FBAS signal in a separating stage 45 in that either the chrominance signal C is subtracted from the incoming FBAS signal or that the FBAS signal is subjected to notch filtering. If necessary, the luminance signal is thereafter matched in time to the processing time for the auxiliary information items in a first delay circuit 46 and then supplied to a second input terminal 2 of the video switching device 49.

The video switching device 49 is controlled by a control signal $sw_1$ which can be obtained, for example, from a known type of synchronization pulse evaluating stage, not shown. The two switches in the video switching device are in the positions 2 and 2' during the scanning lines of the picture signal. The colour sub-carrier modulated auxiliary information items from the lines of the letter box bands of the FBAS signal are initially supplied to a Nyquist filter 41 which, as stated in PCT/EP91/00397, has a –6 dB point at the colour sub-carrier frequency $f_{sc}'$ is likewise supplied to demodulator 41 with a suitable phase angle. The colour sub-carrier frequency $f_{sc}$ can be obtained in known manner from the transmitted burst signal. The necessary phase angle of $f_{sc}'$ which has to correspond to the modulation phase of the auxiliary information items, is produced by a phase shifter 44. The unwanted modulation products of the upper side bands occurring during demodulation are separated out in a low pass filter 43. The low pass filter 43 is intended to limit the base band of the auxiliary information items to frequencies up to the colour subcarrier frequency. The output signal of the low pass filter is supplied to a first input terminal 1 of the video switching device 49. Advantageously, with this circuit arrangement, which obtains separate luminance signal Y and chrominance signal C from a letter box FBAS signal, switching processes are not necessary within the pictures during the recording process in the recorder S-VHS. Consequently, possible oscillatory problems in the filters, etc., are avoided.

When a standard FBAS signal, i.e., no letter box signal, or when a letter box signal having no auxiliary information items is present, the two switches in the video switching device 49 remain in the positions 2 and 2'.

Advantageously, the demodulator 42 can effect amplification of the auxiliary items of information, in order to compensate the amplitude reduction of the auxiliary information items due to the vestigial side band transmission and an embedding in the ultra black range, in addition to the actual demodulation. Furthermore, lifting of the direct voltage level (DC offset) from the ultra black range into, e.g., a middle grey level, is advantageous for recording since the recording can then occur in a defined linear modulation range of the recorder and thus distortions can be reduced or avoided. If necessary, this DC offset can be restored before feeding the recorded signal into a 16:9 picture reproduction apparatus provided with Y/C inputs. During reproduction, the luminance and chrominance signals and the auxiliary information items undergo corresponding processing. The identification of a letter box FBAS signal can be effected by an identification pulse that accompanies the transmission (e.g., during the vertical blanking interval). On the other hand, the fact that the auxiliary information items are transmitted in the ultra black range, i.e., with signal components below the black level, can also be evaluated in a local signal type detector.

Figure 2:
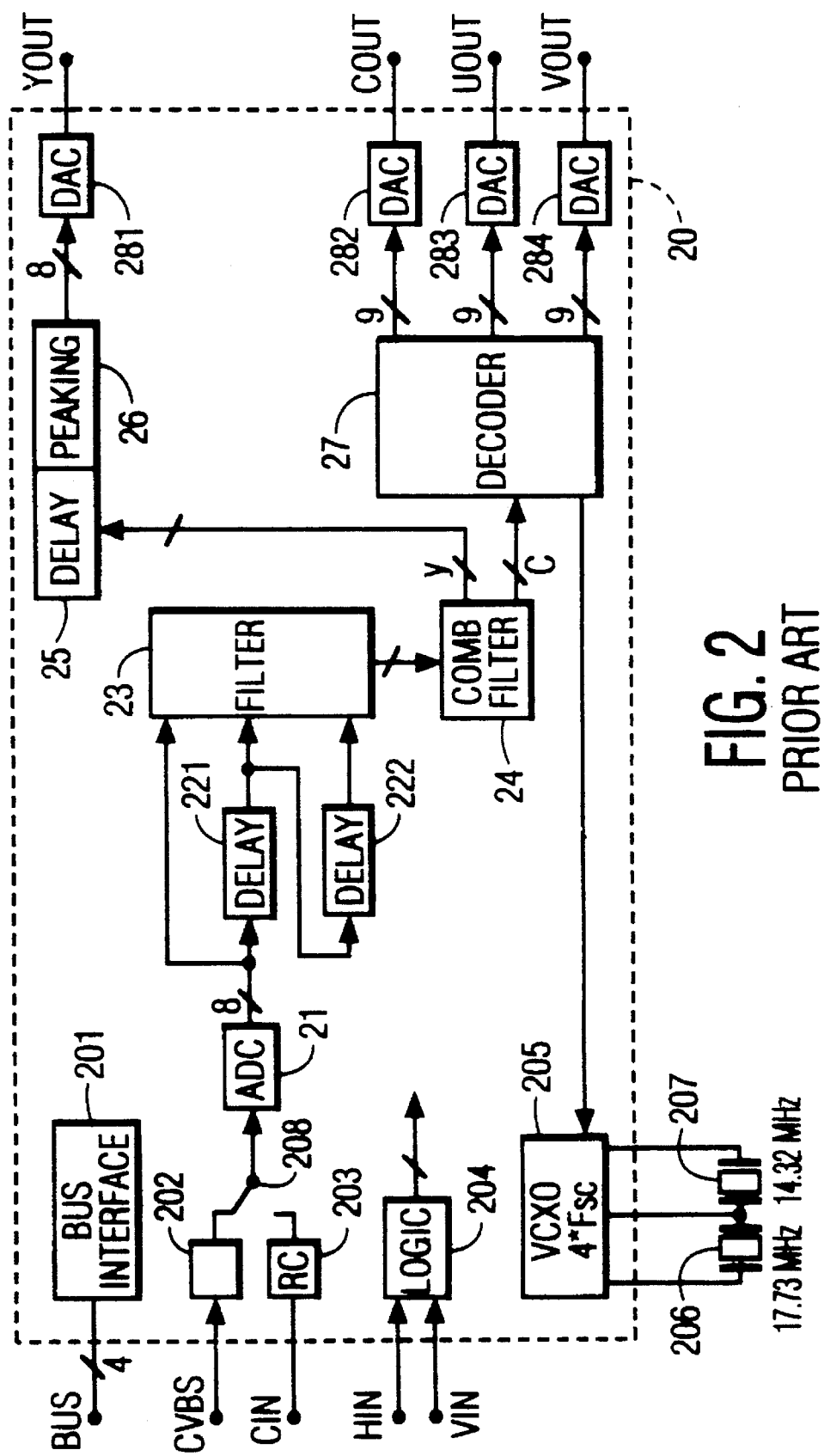
FIG. 2 shows a known digital comb filter circuit.

The circuit 21 depicted within the dashed line-bit can be realized by the digital comb filter circuit 20 illustrated in FIG. 2 if the colour sub-carrier demodulator 42 is digitally executed. The separation of the input signal FBAS into separate luminance signals Y and chrominance signals C can be directly carried out with this circuit since it has an FBAS input CVBS, a luminance output YOUT and a chrominance output COUT. The letter box FBAS signal at the input FBAS is supplied, via a clamping circuit 202 and a clamping switch 208, to an A/D converter 21. Alternatively, a chrominance component carried by a carrier can be applied to the damping switch 208 via an RC stage 203 and the input CIN. The A/D converted FBAS signal is supplied to a first filter stage 23 via a first line delay circuit 221 and via a second line delay circuit 222 whose delay times are matched to the instantaneous television standard. The luminance Y components and the chrominance C components are low pass filtered in filter stage 23. The filtered components arrive in a signal adaptive Y/C comb filter stage 24. The Y component at the output terminal of filter 24 is supplied to a first D/A converter 281 via a luminance delay circuit 25 and a peaking filter 26. The C component at the output terminal of filter 24 is supplied to a chrominance decoder 27. The chrominance decoder demodulates the colour sub-carrier and also contains an automatic amplitude regulator, a colour tint adjustment for NTSC, a PAL logic, a colour-off switch, a colour signal type identification logic and a PLL control stage which controls the phase angle of the frequency $4*f_{sc}$ that is four times the colour sub-carrier frequency generated in a clock pulse generator 205. A first quartz crystal 206 is used to generate the fourfold PAL- and a second quartz crystal 207 is used to generate the fourfold NTSC colour sub-carrier frequency. The chrominance decoder 27 delivers a chrominance signal COUT for further processing in a S-VHS or Hi8 video recorder via a second D/A converter 282, a U component UOUT via a third D/A converter 283 and a V component VOUT in the base band via a fourth D/A converter 284. Corresponding control signals for the components in the integrated circuit are generated in the control logic 204 from the H synchronization and V synchronization pulses present on the inputs HIN and VIN. Various functions of the integrated circuit are controlled or interrogated via the Bus interface circuit 201.

The digital demodulation of quadrature modulated colour signals, such as are used for example in the PAL and NTSC systems, is illustrated in FIG. 3, and is extended for the use in accordance with the invention of digital demodulation of colour sub-carrier modulated auxiliary information items. For the digital processing of colour signals carried on a carrier, it is advantageous to tie the sampling frequency of the analogue to digital converter 21 to the corresponding colour sub-carrier frequency $f_{sc}$. Particular advantages with a view to a simple realization of processing processes, such as the colour demodulation for example, arise, if the sampling frequency is selected to be equal to four times the colour sub-carrier frequency $4*f_{sc}$ and a special phase relationship is thereby maintained. FIG. 3a shows the carrier signals which have a 90° phase displacement due to the quadrature positioning. These carrier signals are modulated by the corresponding colour signal components (not illustrated in FIG. 3). If the sampling phase of the frequency $4*f_{sc}$ that is four times the colour sub-carrier frequency in FIG. 3b is now so selected that the zero crossings and maxima or minima of the carrier signals are sampled, then, on each occasion, there arise two sampling values per carrier period $T_{sc}$, which represent these special values. By a selection of such sampling values by means of a switch S, which is clocked at half the sampling frequency ($2\&f_{sc}$), the carrier signals in accordance with FIG. 3c can be separated out. This process can also be interpreted as sampling at double the colour sub-carrier frequency. Consequently, the spectrum of the colour components carried by a carrier is repeated at odd multiples of the colour sub-carrier frequency as is illustrated in FIG. 3e. The actual demodulation of the carrier frequency colour components, which causes the transfer into the base band, is obtained by a switched weighting of the sampling values by ±1 in correspondence with FIG. 3d. The colour sub-carrier is thus converted to a dc component and the modulated and sampled colour components can be obtained via the D/A converters 282–284. Since the weighting appears in a sequence corresponding to the colour sub-carrier period $T_{sc}$, this process can be conceived as modulation with the colour sub-carrier frequency. In the spectral diagram in accordance with FIG. 3f, the spectral components of the sampling in FIG. 3e are displaced by the colour sub-carrier frequency. One then obtains the wanted colour components in the base band by appropriate low pass filtering.

Figure 3A:
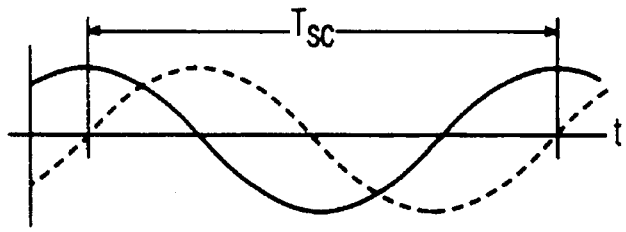
FIGS. 3a to 3f show the known digital demodulation of colour sub-carrier modulated colour signals.
Figure 3B:
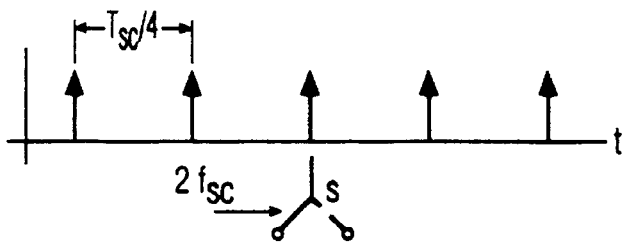
Figure 3C:
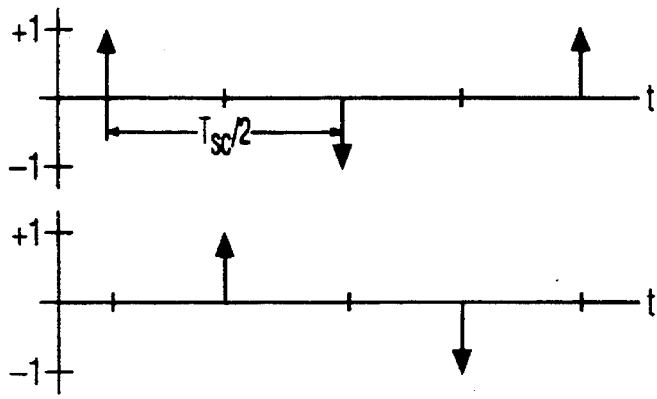
Figure 3D:
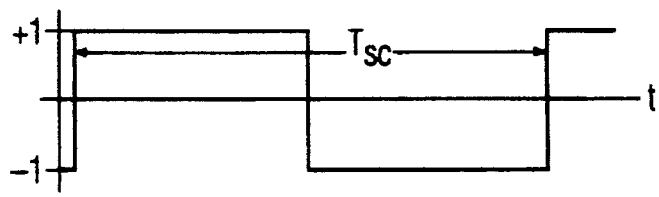
Figure 4A:
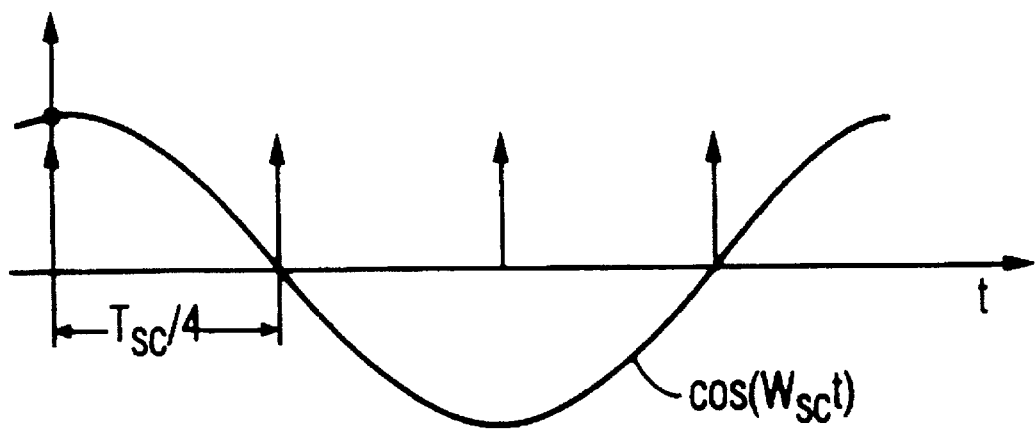
FIGS. 4a and 4b show the digital demodulation of colour sub-carrier modulated auxiliary items of information.
Figure 4B:
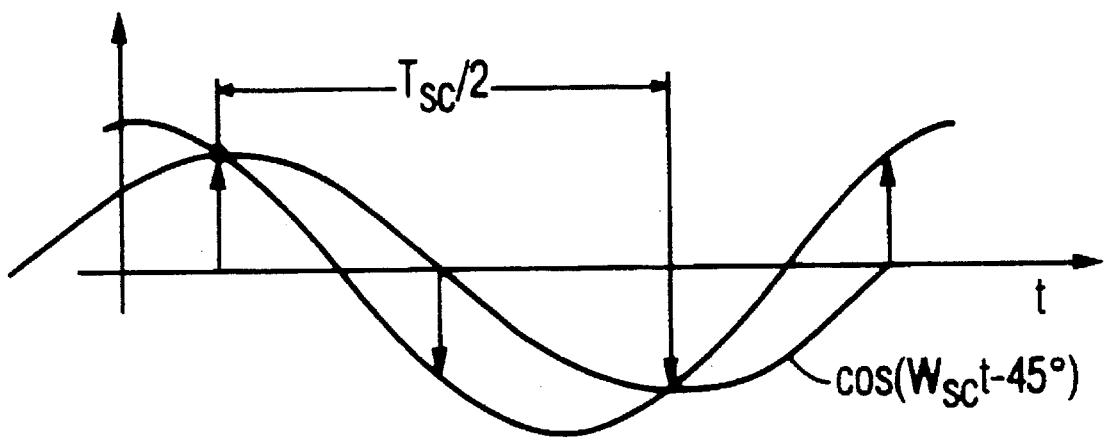

FIG. 4 shows the sampling of a colour sub-carrier which serves as the modulation carrier for the auxiliary items of information. FIG. 4a illustrates the sampling of the carrier cos ($w_{sc}$*t) at a frequency $4*f_{sc}$ that is four times the colour subcarrier frequency wherein sampling is effected at the extreme values and the zero crossings (0° phase displacement). FIG. 4b illustrates the sampling of the same carrier oscillation with a phase angle of the sampling raster displaced by 45° for example. If one now only takes into consideration every second sampling value, as is also illustrated in FIGS. 3b and 3c, one then obtains sampling values which represent a carrier oscillation cos ($w_{sc}$*t-45°) that is displaced by 45°. This oscillation then demodulates the auxiliary items of information with the correct phase in the manner illustrated in accordance with FIGS. 3d and 3f if they have been likewise modulated at the transmitter end by a carrier oscillation cos($w_{sc}$*t–45°). The correctly phased demodulation of the auxiliary items of information having an arbitrary modulation phase can be achieved by a corresponding phase displacement of the scanning raster at the receiving end in accordance with FIG. 4b. In general, the phase angle of the transmitter end modulation of the auxiliary items of information is known so that, at the receiving end, the corresponding evaluation of the colour bursts is sufficient in order to produce the required phase angle of the scanning raster by a phase shifter. In accordance with FIG. 4b, it is sufficient to provide a sampling frequency having twice the frequency of the colour sub-carrier frequency $2*f_{sc}=1/[T_{sc}/2]$ and a corresponding phase angle for the demodulation of the auxiliary items of information.

Figure 3E:
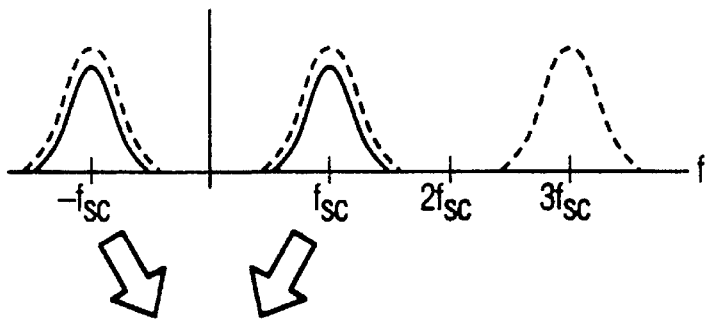
Figure 3F:
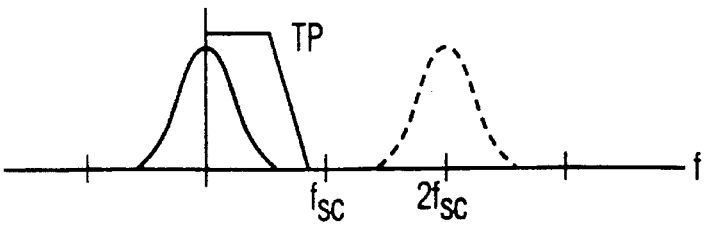

In accordance with FIG. 3c and FIG. 3e, the effective sampling frequency for the chrominance is likewise only $2*f_{sc}$. A sampling in the A/D converter 21 at twice the colour sub-carrier frequency is then sufficient for the luminance chrominance separation and demodulation of the auxiliary items of information when using the comb filter circuit of FIG. 2. The chrominance signals are band pass filtered in the first filter stage 23 and then correspond to the illustration in accordance with FIG. 3e wherein the illustrated spectra now contain both quadrature components as is necessary for the chrominance recording in the S-VHS mode.

Figure 5A:
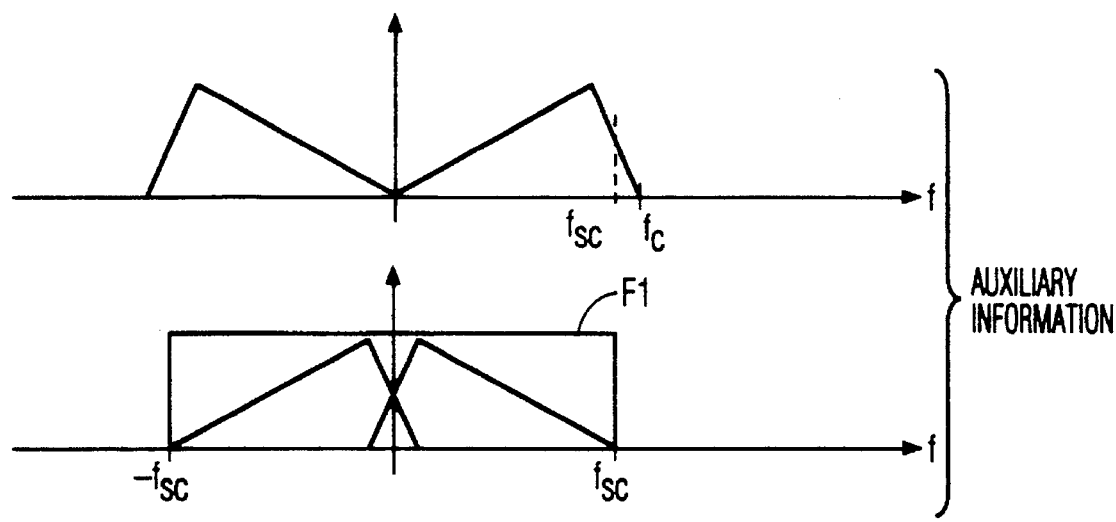
FIGS. 5a and 5b show a spectral diagram of the demodulation of auxiliary items of information and the sampling of the main signal.
Figure 5B:
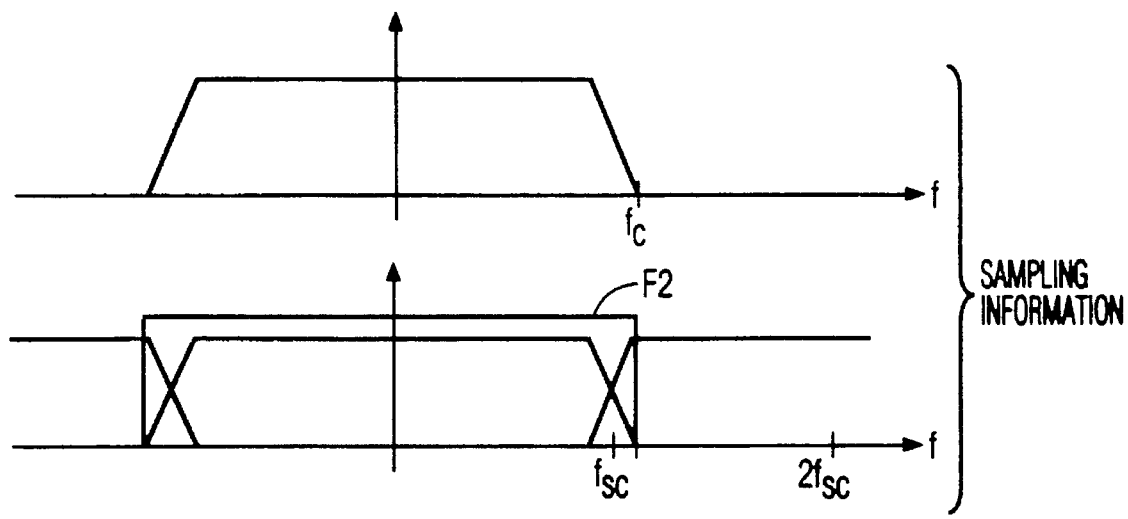

FIG. 5 depicts a spectral diagram of the demodulation or sampling of auxiliary information items and main signals. The demodulation of spectrally randomly formed auxiliary information items is illustrated in FIG. 5a. The auxiliary information is modulated by the colour sub-carrier for the transmission and, after Nyquist filtering at the receiver end, has a Nyquist slope with reference to the colour sub-carrier. Due to the demodulation, these slope regions complement one another, in the vicinity of the frequency 0 and over a width which corresponds to the slope width, to a constant waveform in the spectrum. The filtering F1 in the chrominance decoder 27, which is required after the demodulation, reduces the spectrum down to the colour sub-carrier frequency $f_{sc}$. If a sampling at twice the colour sub-carrier frequency is applied to the main signal spectrum, which extends for example up to the channel edge $f_c$ (5 MHz), there results the diagram illustrated in FIG. 5b. Here, it is assumed that the Nyquist filter 41 located in the input of the circuit in accordance with FIG. 1 is also active during the lines of the main signal and is not short circuited by a switch. The low pass filtering having the limit frequency $f_c$ that is required after the sampling is indicated by the filter F2.

In principle, post filtering in accordance with filter F1 during the letter box lines and post filtering in accordance with filter F2 during the main signal lines can now be effected by periodically switching over sets of filter coefficients. However, the overlapping region or the loss of resolution is so small that advantageously only one type of filter having a limit frequency $f_{grenz}$ lying between $f_{sc}$ and $f_c$ has to be used.

It is equally possible to integrate the Nyquist filter 41 into the circuit of FIG. 2 and to place it for a digital realization after the sampling in the A/D converter 21. For the realization of the Nyquist flank region, a sampling frequency $>2*f_{sc}$, for example a sampling frequency of $4*f_{sc}$, is then necessary. The demodulation of the auxiliary information items then occurs in the manner illustrated in FIG. 4 by utilization of each second sampling value.

For the processing of standard signals, i.e., signals not having auxiliary information items, the demodulation can be switched off by a marking pulse which is transmitted, for example, during the vertical blanking interval for identifying FBAS signals with/without auxiliary items of information.

For the recording of auxiliary information items, which were demodulated in accordance with the invention with the help of the modified inserted comb filter circuit, it is expedient to raise the direct voltage level (dc value) to an average grey value before the recording. The recording channel is thereby driven in the most linear region. This function too can be undertaken by the integrated circuit.

Before the reproduction of the recording, the complete demodulation process can be reversed by appropriate modulation and renewed transfer of the modulated auxiliary items of information into the ultra black region.

The circuit described for the demodulation of auxiliary information items and simultaneous luminance chrominance separation can be installed as an adaptor or be an integral assembly of equipments for two channel recording of Y and C, for example, S-VHS or Hi8 recorders.

I claim:

1. Apparatus for recording/reproducing television signals transmitted in the letter-box format whereby a 16:9 aspect ratio picture is sandwiched between black areas disposed at the top and bottom portions of the display, and wherein auxiliary items of information can be modulated onto a color sub-carrier of said television signal, said apparatus having a chrominance channel and comprising;

an adaptive filter means, comb filter means and a chrominance decoder means for separating said television signal into a chrominance component and a luminance component for NTSC and PAL signals;

means for demodulating said auxiliary information items from said color sub-carrier; and means for applying said auxiliary demodulated auxiliary information to said luminance channel during scanning of said black areas, said chrominance decoder including means for sampling said color sub-carrier at twice the frequency of said color sub-carrier to provide a color sub-carrier oscillation having a phase angle corresponding to the modulation phase angle of said color sub-carrier.

2. The apparatus of claim 1 further including means for sampling said television signal at four times the frequency of said color subcarrier.

* * * * *